United States Patent
Wang et al.

(10) Patent No.: US 11,739,451 B2
(45) Date of Patent: Aug. 29, 2023

(54) NONWOVEN WEB WITH BIMODAL FIBER DISTRIBUTION

(71) Applicant: CUMMINS FILTRATION IP, INC., Columbus, IN (US)

(72) Inventors: Kan Wang, Cookeville, TN (US); William C. Haberkamp, Cookeville, TN (US)

(73) Assignee: CUMMINS FILTRATION IP, INC., Columbus, IN (US)

(*) Notice: Subject to any disclaimer, the term of this patent is extended or adjusted under 35 U.S.C. 154(b) by 452 days.

(21) Appl. No.: 16/929,317

(22) Filed: Jul. 15, 2020

(65) Prior Publication Data
US 2020/0354869 A1 Nov. 12, 2020

Related U.S. Application Data

(62) Division of application No. 15/502,648, filed as application No. PCT/US2015/047894 on Sep. 1, 2015, now abandoned.
(Continued)

(51) Int. Cl.
*D04H 1/4382* (2012.01)
*D04H 1/435* (2012.01)
(Continued)

(52) U.S. Cl.
CPC ..... *D04H 1/43835* (2020.05); *B01D 39/1623* (2013.01); *D01D 5/0985* (2013.01);
(Continued)

(58) Field of Classification Search
CPC . Y10T 442/60; D01F 8/14; D01F 6/82; B32B 5/022; B32B 2262/0276; B32B 2262/0284; B32B 2262/144
See application file for complete search history.

(56) References Cited

U.S. PATENT DOCUMENTS

| 4,131,704 A | 12/1978 | Erickson et al. |
| 4,581,185 A | 4/1986 | Kelchner, Jr. |
(Continued)

FOREIGN PATENT DOCUMENTS

| CN | 1501833 A | 6/2004 |
| CN | 1922262 A | 2/2007 |
(Continued)

OTHER PUBLICATIONS

First Office Action issued for Chinese Patent Application No. 201580044908.5, dated Jun. 12, 2018, 6 pages.
(Continued)

*Primary Examiner* — Jennifer A Steele
(74) *Attorney, Agent, or Firm* — Foley & Lardner LLP

(57) ABSTRACT

A nonwoven web comprising a layer of polymeric fibers, wherein, based on the total number of polymeric fibers, at least 10% the polymeric fibers in said layer are coarse fibers having a fiber diameter of 4 µm or more, and at least 10% of the polymeric fibers in said layer are fine fibers having a fiber diameter of 2 µm or less. Also described herein is a method for making the nonwoven web, comprising melt-blowing a polymer mixture comprising two immiscible or partially miscible polymers.

20 Claims, 5 Drawing Sheets

Related U.S. Application Data

(60) Provisional application No. 62/044,629, filed on Sep. 2, 2014.

(51) Int. Cl.
  *D04H 1/56* (2006.01)
  *D04H 3/16* (2006.01)
  *D01F 8/14* (2006.01)
  *D01D 5/098* (2006.01)
  *D01F 6/82* (2006.01)
  *B01D 39/16* (2006.01)

(52) U.S. Cl.
  CPC ............ *D01F 6/82* (2013.01); *D01F 8/14* (2013.01); *D04H 1/435* (2013.01); *D04H 1/43838* (2020.05); *D04H 1/56* (2013.01); *D04H 3/16* (2013.01); *B01D 2239/0216* (2013.01); *B01D 2239/064* (2013.01); *B01D 2239/1233* (2013.01)

(56) References Cited

U.S. PATENT DOCUMENTS

| | | | |
|---|---|---|---|
| 4,661,390 A | 4/1987 | Kelchner, Jr. | |
| 5,597,645 A | 1/1997 | Pike et al. | |
| 5,685,757 A | 11/1997 | Kirsch et al. | |
| 5,753,736 A * | 5/1998 | Bhat | D01F 1/10 442/361 |
| 6,051,175 A | 4/2000 | Kurihara et al. | |
| 7,491,770 B2 | 2/2009 | Autran et al. | |
| 7,989,371 B2 | 8/2011 | Angadjivand et al. | |
| 2005/0039836 A1* | 2/2005 | Dugan | D04H 3/14 156/62.2 |
| 2008/0026659 A1* | 1/2008 | Brandner | D04H 1/56 28/100 |
| 2008/0318014 A1 | 12/2008 | Angadjivand et al. | |
| 2008/0318024 A1* | 12/2008 | Angadjivand | D01D 5/0985 264/45.3 |
| 2011/0250815 A1 | 10/2011 | Pourdeyhimi | |

FOREIGN PATENT DOCUMENTS

| | | |
|---|---|---|
| CN | 101495208 A | 7/2009 |
| CN | 101688342 | 3/2010 |
| CN | 103710883 A | 4/2014 |
| CN | 103917701 A | 7/2014 |
| EP | 0 702 994 | 3/1996 |
| KR | 20140101340 | 8/2014 |
| WO | WO-2013/080955 A1 | 6/2013 |

OTHER PUBLICATIONS

International Search Report and Written Opinion issued in PCT/US2015/047894, dated Dec. 4, 2015.

Non-Final Office Action for U.S. Appl. No. 15/502,648, dated Dec. 14, 2018.

* cited by examiner

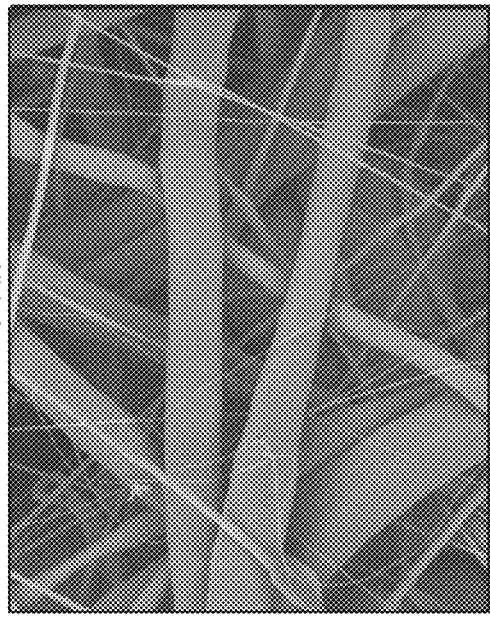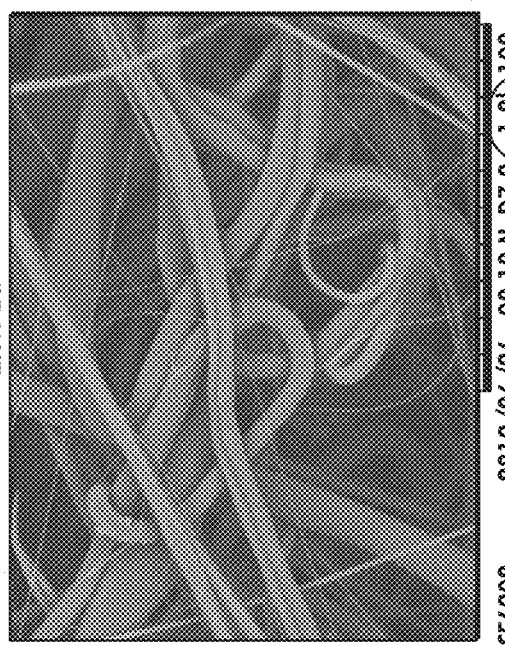

|  | Basis W. (gsm) | Air Perm. (cfm) | 10um Eff. (%) | Capacity (mg/in³) | Processing condition |
| --- | --- | --- | --- | --- | --- |
| Lube Media (Composite) | 100 | 60-70 | 55 | 120 | prod. recipe |
| LCP/PBT Media 1 (Single layer) | 90 | 75-85 | 72 | 180 | low air speed large DCD |
| LCP/PBT Media 2 (Single layer) | 90 | 65-75 | 85 | 135 | medium air speed large DCD |
| LCP/PBT Media 3 (Single layer) | 90 | 45-60 | 92 | 140 | medium air speed medium DCD |

FIGURE 5

NONWOVEN WEB WITH BIMODAL FIBER DISTRIBUTION

CROSS-REFERENCE TO RELATED APPLICATIONS

This application is a divisional of U.S. patent application Ser. No. 15/502,648, filed Feb. 8, 2017, which is the U.S. National Stage of PCT Application No. PCT/US2015/047894, filed on Sep. 1, 2015, which claims the benefit of U.S. Provisional Patent Application No. 62/044,629, filed Sep. 2, 2014, the contents of which are incorporated herein by reference in their entireties.

BACKGROUND

Current melt blown technology produces uniform fibers that may be either coarse or fine fibers, but cannot make both coarse and finer fibers simultaneously without multiple layers. In many applications, each range of fiber diameters has desirable properties.

SUMMARY

Described herein a melt blown media with distinct bimodal fiber distribution resulting in coarse structural fibers for low pressure drop and fine fibers for high efficiency within one single melt blown layer.

Various embodiments described herein relate to a nonwoven web comprising a layer of polymeric fibers, wherein, based on the total number of polymeric fibers, at least 10% the polymeric fibers in said layer are coarse fibers having a fiber diameter of 4 μm or more, and at least 10% of the polymeric fibers in said layer are fine fibers having a fiber diameter of 2 μm or less. In some embodiments, the polymeric fibers in the nonwoven web have bimodal distribution of their fiber diameters.

Further embodiments described herein relate to a method for making the nonwoven web, comprising melt-blowing a polymer mixture comprising at least two immiscible or partially miscible polymers. In some embodiments, the polymer mixture comprises liquid crystalline polymer (LCP) and polybutylene terephthalate (PBT). In some embodiments, the polymer mixture is made by compounding and/or blending at least two polymers.

These and other features, together with the organization and manner of operation thereof, will become apparent from the following detailed description when taken in conjunction with the accompanying drawings.

BRIEF DESCRIPTION OF THE DRAWINGS

FIGS. 1A-1D show example SEM images of melt blown fibers from (a) standard PBT (×1000), (b) 5% LCP in PBT (×1000), and (c) 2.5% LCP in PBT (×1000), and (d) 2.5% LCP in PBT (×500).

FIG. 5 shows example performance comparison between an existing product and the inventive nonwoven web described herein (the melt blown media of 2.5% LCP in PBT).

DETAILED DESCRIPTION

Figure 2:
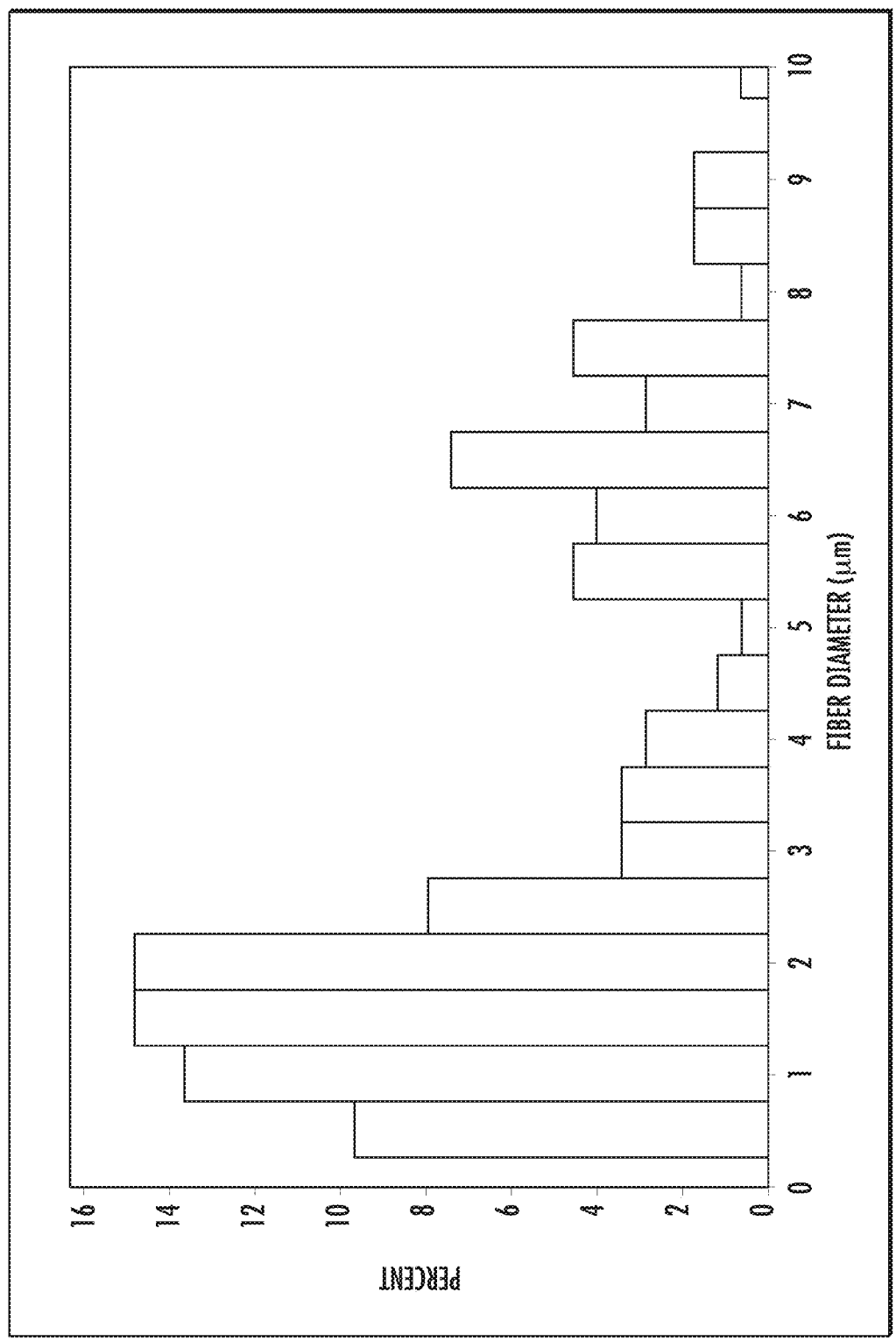
FIG. 2 shows example bimodal fiber diameter distribution of 2.5% LCP sample.

A bimodal distribution of fiber diameters possesses distinct advantages over other single layers and even gradient fiber structures of melt blown. A method of compounding and blending polymers of significantly different rheological properties results in a melt blown layer with a controlled bimodal fiber distribution. The fine fiber population in the distribution is composed of a significant portion of submicron fibers which are even finer than normal melt blowing allows. The coarse fibers contribute higher permeability, while the very fine fibers results in even higher efficiency than uniform or gradient media of similar permeability.

Controlled processing of immiscible or partially miscible polymers, such as LCP and PBT, results in unique transitions from coarse to fine fiber. The LCP described herein refers to any liquid crystalline polymer of aromatic polyester with a highly ordered structure in both melt and solid states. Preparation of LCP/PBT materials with designed mixing ratios by using polymer compounding, physical blending, or combination of compounding and blending, and controlled melt blowing process conditions result in a LCP/PBT media with wider and unique bimodal fiber distribution and improved performance.

This LCP/PBT media can be used in any current air or liquid filtration or coalescing system currently using PBT with equivalent temperature, chemical, and hydrolytic resistance. Trials completed on pilot machine demonstrate ability for these materials to run on production machines, with the unique and advantageous properties for applications in fuel, lube, crankcase ventilation (CV), and air filtration products. The coarse structure leads to high permeability yet the finer fiber content contributes high efficiency.

The nonwoven web described herein may comprise, for example, a layer of polymeric fibers, wherein, based on the total number of polymeric fibers, at least 10% of the fibers in said layer are coarse fibers having a fiber diameter of 3 μm or more, or 4 μm or more, or 5 μm or more, and at least 10% of the polymeric fibers in said layer are fine fibers having a fiber diameter of 3 μm or less, or 2 μm or less, or 1 μm or less.

In some embodiments of the nonwoven web, at least 10%, or at least 20%, or at least 30%, or about 30-60% of the polymeric fibers are coarse fibers having a fiber diameter of 3 μm or more, based on the total number of polymeric fibers. In some embodiments of the nonwoven web, at least 10%, or at least 20%, or at least 30%, or about 30-60% of the polymeric fibers are coarse fibers having a fiber diameter of 4 μm or more, based on the total number of polymeric fibers. In some embodiments of the nonwoven web, at least 10%, or at least 20%, or at least 30%, or about 30-60% of the polymeric fibers are coarse fibers having a fiber diameter of 5 μm or more, based on the total number of polymeric fibers.

In some embodiments of the nonwoven web, at least 10%, or at least 20%, or at least 30%, or at least 40%, or about 40-70% of the polymeric fibers are fine fibers having a fiber diameter of 3 μm or less, based on the total number of polymeric fibers. In some embodiments of the nonwoven web, at least 10%, or at least 20%, or at least 30%, or at least 40%, or about 40-70% of the polymeric fibers are fine fibers having a fiber diameter of 2 μm or less, based on the total number of polymeric fibers. In some embodiments of the nonwoven web, at least 10%, or at least 20%, or at least 30%, or at least 40%, or about 40-70% of the polymeric fibers are fine fibers having a fiber diameter of 1 μm or less, based on the total number of polymeric fibers.

Figure 3:
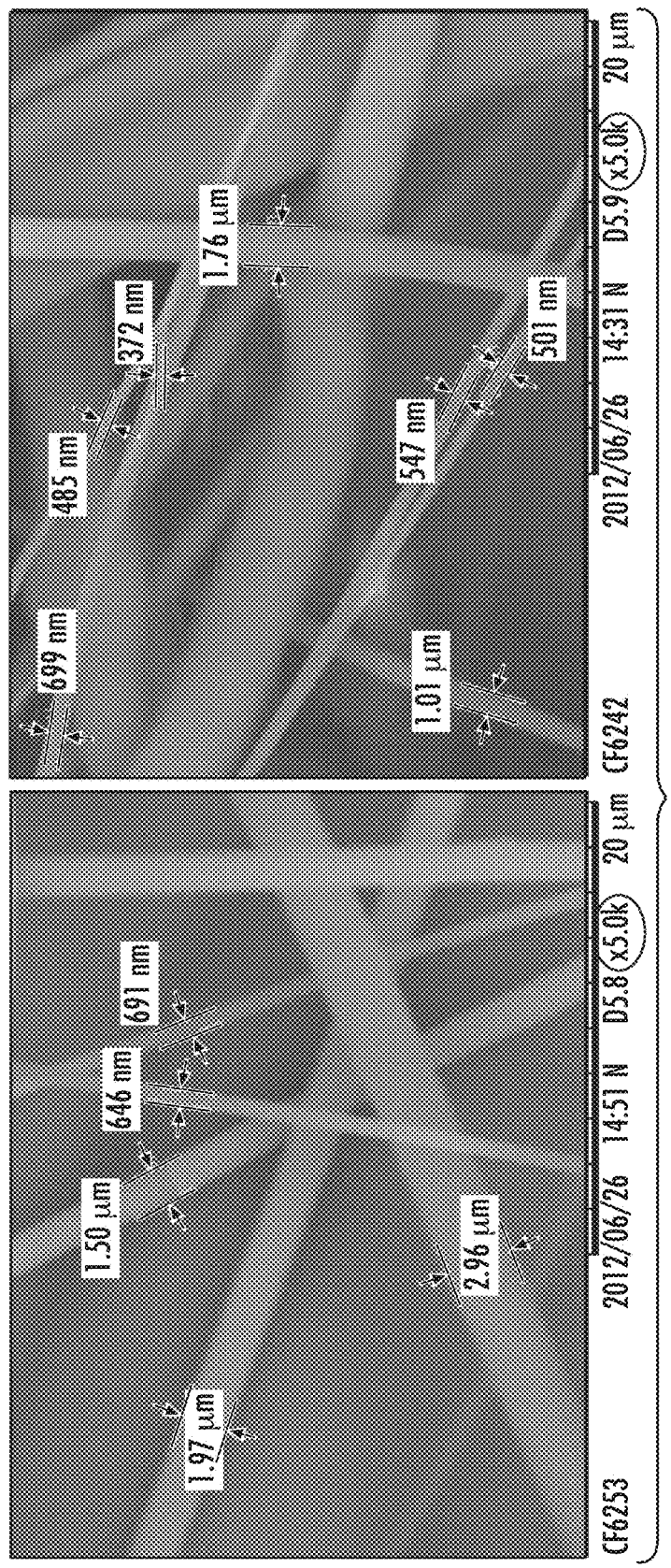
FIG. 3 shows example SEM images (×5000) of submicron fibers on the melt blown media of 2.5% LCP in PBT.

In some embodiments of the nonwoven web, the polymeric fibers have bimodal distribution of their fiber diameters. The bimodal distribution can comprise a first distribution population and a second distribution population, as shown in FIG. 3.

The first distribution population ($d_1$) can comprise about 40-70% of the total number of polymeric fibers, with a first distribution peak at a fiber diameter of 3 μm or less, or 2 μm or less, or 1 μm or less. The geometric mean diameter of the first distribution population can be about 0.50-2 μm or, more specifically, 0.75-2 μm.

The second distribution population ($d_2$) can comprise about 30-60% of the total number of polymeric fibers, with a second distribution peak at a fiber diameter of 3 μm or more, or 4 μm or more, or 5 μm or more, or 6 μm or more. The geometric mean diameter of the second distribution population can be about 3-15 μm.

The first distribution population and the second distribution population can be separated by a distribution trough, with a minimum distribution point ($d_m$) at a fiber diameter of 1.5-7 μm. In some embodiment, 20% or less, or 10% or less, or 5% or less of the total number of polymeric fibers have a fiber diameter within ±0.5 μm of $d_m$. In other words, the fiber population of ($d_m$-0.5 μm, $d_m$+0.5 μm) can be less than 20%, or less than 10%, or less than 5% of total fiber amount.

In some embodiments of the nonwoven web, the polymeric fibers are melt-blown fibers. The polymeric fibers can comprise, for example, two immiscible or partially miscible polymers. The polymeric fibers can comprise, for example, 0.5-10 wt. % LCP. The polymeric fibers can comprise, for example, PBT. The polymeric fibers can comprise 0.5-10 wt. % LCP, with the remaining polymeric material within the fibers being PBT. The LCP and PBT fibers are not necessarily separate but can be in the form of a polymeric mixture, mixed by weight % in the recipe.

In some embodiments, the nonwoven web has an air permeability of 20 cfm or more, or 40 cfm or more, or 50 cfm or more, or 60 cfm or more, or 70 cfm or more, or between 40-60 cfm, or between 50-70 cfm, or between 60-80 cfm, or between 70-90 cfm. Media permeability was measured per standard textile method INDA IST 70.1 or ASTM D737-96 with a sample size of 38.3 cm² to a differential pressure of 125 Pa.

In some embodiments, the nonwoven web has a filtration ratio at particle size of 10 μm (or 10 μm efficiency) of 40% or more, or 60% or more, or 70% or more, or 80% or more, or 90% or more.

In some embodiments, the nonwoven web has a filtration capacity of 130 mg/in² or more, or 140 mg/in² or more, or 150 mg/in² or more, or 160 mg/in² or more, or 170 mg/in² or more, or 180 mg/in² or more. Media efficiency and capacity data were collected on a multipass test stand using the ISO 4548-12 standard. For these tests the sample size was 200 cm² with a terminal pressure drop of 240-250 kPa and a test flow rate of 3 liters per minute. In other embodiments, the nonwoven web may have a lower filtration capacity, for example of 70 mg/in² or even 50 mg/in².

The nonwoven web described here can be made by, for example, melt-blowing a polymer mixture comprising two immiscible or partially miscible polymers.

In some embodiments, the polymer mixture is obtained by compounding the two immiscible or partially miscible polymers. Alternatively, the polymer mixture may be obtained by physically blending the two immiscible or partially miscible polymers. Still further, the polymer mixture is obtained by both compounding and physically blending.

In some embodiments, the polymer mixture comprises 0.5-30 wt. % LCP, and PBT.

In some embodiments, the polymer mixture is melt-blown according to the following process conditions on a 0.5 meter wide pilot line: (a) die temperature of 250-310° C., (b) air flow rate of 4-14 m³/min, (c) throughput of 4-20 kg/hr, (d) drum collector distance of 10-50 cm, and (e) extruder speed of 50-120 rpm.

ADDITIONAL EMBODIMENTS

Embodiment 1

A nonwoven web comprising a layer of polymeric fibers, wherein, based on the total number of polymeric fibers, at least 10% of the polymeric fibers in said layer are coarse fibers having a fiber diameter of 4 μm or more. At least 10% of the polymeric fibers in said layer are fine fibers having a fiber diameter of 2 μm or less.

Embodiment 2

The nonwoven web of Embodiment 1, wherein at least 25% polymeric fibers in said layer are coarse fibers having a fiber diameter of 4 μm or more, based on the total number of polymeric fibers.

Embodiment 3

The nonwoven web of any of Embodiments 1-2, wherein at least 25% polymeric fibers in said layer are coarse fibers having a fiber diameter of 5 μm or more, based on the total number of polymeric fibers.

Embodiment 4

The nonwoven web of any of Embodiments 1-3, wherein at least 25% polymeric fibers in said layer are fine fibers having a fiber diameter of 2 μm or less, based on the total number of polymeric fibers.

Embodiment 5

The nonwoven web of any of Embodiments 1-4, wherein at least 25% polymeric fibers in said layer are fine fibers having a fiber diameter of 1 μm or less, based on the total number of polymeric fibers.

Embodiment 6

The nonwoven web of any of Embodiments 1-5, wherein the polymeric fibers in said layer have bimodal distribution of their fiber diameters, based on the total number of polymeric fibers.

Embodiment 7

The nonwoven web of any of Embodiments 1-6, wherein the polymeric fibers in said layer have bimodal distribution of their fiber diameters, comprising a first peak at a first fiber diameter of 2 μm or less and a second peak at a second fiber diameter of 4 μm or more.

Embodiment 8

The nonwoven web of any of Embodiments 1-7, wherein the polymeric fibers in said layer have bimodal distribution of their fiber diameters, comprising a first peak at a first fiber diameter of 2 μm or less, a second peak at a second fiber diameter of 4 μm or more, and a trough at a third fiber diameter between the first fiber diameter and the second fiber diameter, wherein 10% or less of the polymeric fibers have a fiber diameter within ±0.5 μm of the third fiber diameter, based on the total number of polymeric fibers.

Embodiment 9

The nonwoven web of any of Embodiments 1-8, wherein the polymeric fibers in said layer have bimodal distribution of their fiber mean, comprising a first peak at a first fiber diameter of 2 μm or less, a second peak at a second fiber diameter of 4 μm or more, and a trough at a third fiber diameter between the first fiber diameter and the second fiber diameter, wherein 5% or less of the polymeric fibers have a fiber diameter within ±0.5 μm of the third fiber diameter, based on the total number of polymeric fibers.

Embodiment 10

A nonwoven web comprising a layer of polymeric fibers, wherein, based on the total number of polymeric fibers, at least 10% of the polymeric fibers in said layer are coarse fibers having a fiber diameter of 3 μm or more, and at least 10% of the polymeric fibers in said layer are fine fibers having a fiber diameter of 1 μm or less.

Embodiment 11

The nonwoven web of Embodiment 10, wherein at least 25% polymeric fibers in said layer are coarse fibers having a fiber diameter of 3 μm or more, and at least 25% polymeric fibers in said layer are fine fibers having a fiber diameter of 1 μm or less, based on the total number of polymeric fibers.

Embodiment 12

The nonwoven web of Embodiment 10 or 11, wherein the polymeric fibers in said layer have bimodal distribution of their fiber diameters, comprising a first peak at a first fiber diameter of 1 μm or less, a second peak at a second fiber diameter of 3 μm or more, and a trough at a third fiber diameter between the first fiber diameter and the second fiber diameter, wherein 10% or less of the polymeric fibers have a fiber diameter within ±0.5 μm of the third fiber diameter, based on the total number of polymeric fibers.

Embodiment 13

A nonwoven web comprising a layer of polymeric fibers, wherein, based on the total number of polymeric fibers, at least 10% of the polymeric fibers in said layer are coarse fibers having a fiber diameter of 5 μm or more, and at least 10% of the polymeric fibers in said layer are fine fibers having a fiber diameter of 3 μm or less.

Embodiment 14

The nonwoven web of Embodiment 13, wherein at least 25% polymeric fibers in said layer are coarse fibers having a fiber diameter of 5 μm or more, and at least 25% polymeric fibers in said layer are fine fibers having a fiber diameter of 3 μm or less, based on the total number of polymeric fibers.

Embodiment 15

The nonwoven web of Embodiment 13 or 14, wherein the polymeric fibers in said layer have bimodal distribution of their fiber diameters, comprising a first peak at a first fiber diameter of 3 μm or less, a second peak at a second fiber diameter of 5 μm or more, and a trough at a third fiber diameter between the first fiber diameter and the second fiber diameter, wherein 10% or less of the polymeric fibers have a fiber diameter within ±0.5 μm of the third fiber diameter, based on the total number of polymeric fibers.

Embodiment 16

The nonwoven web of any of Embodiments 1-15, wherein the polymeric fibers are melt-blown fibers.

Embodiment 17

The nonwoven web of any of Embodiments 1-16, wherein the polymeric fibers comprises 0.5-10 wt. % liquid crystalline polymer.

Embodiment 18

The nonwoven web of any of Embodiments 1-17, wherein the polymeric fibers comprises polybutylene terephthalate.

Embodiment 19

The nonwoven web of any of Embodiments 1-18, wherein the nonwoven web has an air permeability of 40 cfm or more.

Embodiment 20

The nonwoven web of any of Embodiments 1-19, wherein the nonwoven web has a filtration ratio of 60% or more at particle size of 10 μm.

Embodiment 21

The nonwoven web of any of Embodiments 1-20, wherein the nonwoven web has a filtration capacity of 130 mg/in$^2$ or more.

Embodiment 22

A method for making the nonwoven web of any of Embodiments 1-21, comprising melt-blowing a polymer mixture comprising at least two immiscible or partially miscible polymers.

Embodiment 23

The method of Embodiment 22, wherein the polymer mixture is obtained by compounding and/or physically blending the two immiscible or partially miscible polymers.

Embodiment 24

The method of Embodiment 22 or 23, wherein the polymer mixture comprises (a) 0.5-30 wt. % liquid crystalline polymer and (b) polybutylene terephthalate.

Embodiment 25

The nonwoven web of any of Embodiments 1-21, wherein said layer of polymeric fibers is obtained by a method comprising melt-blowing a polymer mixture comprising at least two immiscible or partially miscible polymers, wherein the polymer mixture is obtained by compounding and/or physically blending the two immiscible or partially miscible polymers.

Embodiment 26

The nonwoven web of any of Embodiments 1-21, wherein said layer of polymeric fibers is obtained by a method comprising melt-blowing a polymer mixture comprising (a) 0.5-30 wt. % liquid crystalline polymer and (b) polybutylene terephthalate, wherein the polymer mixture is obtained by compounding and/or physically blending the liquid crystalline polymer and the polybutylene terephthalate.

Working Examples

Material Preparation.

Polymer mixture comprising PBT and 0.5-10 wt. % LCP were made according to one of the following three options: (1) compounding LCP and PBT; (2) physically blending LCP and PBT; and (3) combination of compounding and blending (e.g., use compounded LCP/PBT alloy comprising 0-40 wt. % LCP to physically blend with neat PBT (1-30 wt. % alloy) to finally get 0.5-10 wt. % LCP at finish).

Melt Blown Process.

The polymer mixtures prepared as described above were melt-blown according to the following process conditions on a 0.5 meter wide pilot line: (a) die temperature: 250-310° C.; (b) air flow rate: 4-14 m³/min; (c) throughput: 4-20 kg/hr; (d) drum collector distance: 10-50 cm; (e) extruder speed: 50-120 rpm. Nonwoven webs comprising both coarse fibers and fine fibers in a single layer were obtained, as shown in FIGS. 1 and 3.

Fiber Diameter Distribution of Nonwoven Web.

Figure 4:
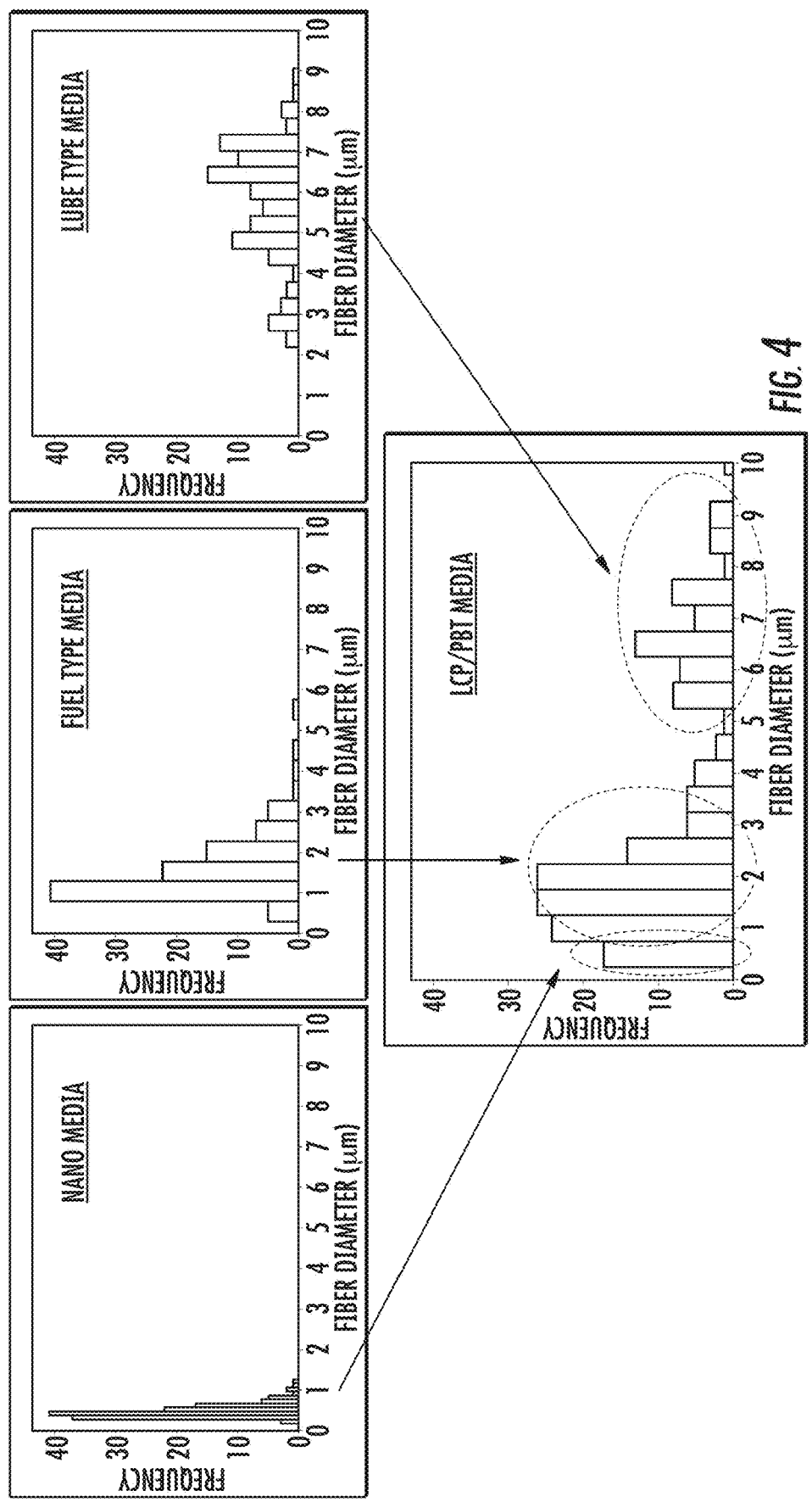
FIG. 4 shows example fiber size distribution comparisons between existing media and the inventive nonwoven web described herein.

As shown in FIGS. 2 and 4, the nonwoven web has wider and bimodal fiber diameter distribution and includes submicron, fine micron, and coarse micron fibers in one melt blown layer, which could lead to more comprehensive performance than any one of them. Statistical analysis shows that the fiber diameter distribution of the nonwoven web comprises (i) a first distribution population ($0<d_1<d_m$) having a geometric mean diameter $GMd_1$ of 0.75-2 μm and representing 40%-70% of total fiber amount; (ii) a second distribution population ($d_2>d_m$) having a geometric mean diameter $GMd_2$ of 3-15 μm and representing 30%-60% of total fiber amount, wherein $GMd_2=(4-7.5)\times GMd_1$; and (iii) a minimum distribution point ($d_m$) between first and second distribution populations, wherein $d_m=1.5$-7 μm and $d_m=(2$-$3.5)\times GMd_1$, and wherein the population of ($d_m$-0.5 μm, $d_m$+0.5 μm) represents less than 5% of total fiber amount.

Performance of Nonwoven Web.

As shown in FIG. 5, the bimodal media has lower basis weight and better performance than a current melt blown polymer lube filter media. Coarser fibers in LCP/PBT media can lead to higher air permeability (lower restriction), while finer fibers can still provide very good efficiency. The media property and performance can be well controlled by processing recipe. In addition, single layer process and low air flow rate in melt blowing process could result in energy saving. Aerosol applications, such as crankcase ventilation (CV), are likely to benefit.

LCP/PBT materials were prepared by polymer compounding, physical blending, and combination of compounding and blending with designed compositions. LCP and PBT polymers have significantly different rheological and thermal properties. Without modifying the die, controlled melt blown processing of this immiscible LCP/PBT system resulted in unique structure containing both coarse and fine fibers which were formed simultaneously in single layer media process.

As a result, this melt blown LCP/PBT media has much wider fiber size distribution, ranging from 0.2 μm to 30 μm, than normal melt blown polyester media does. As shown in FIG. 3, the fine fiber population in the distribution is composed of a significant portion of sub-micron fibers which are even finer than normal melt blowing allows. The coarse fibers contribute higher permeability while the very fine fibers results in even higher efficiency than uniform or gradient media of similar permeability. This LCP/PBT media may be used in any current air or liquid filtration or coalescing system currently using PBT with equivalent temperature, chemical, and hydrolytic resistance. The wider and unique bimodal distribution of fiber diameters has distinct advantages over other single layers and even gradient fiber structures of melt blown media.

As used herein, the singular terms "a," "an," and "the" include plural referents unless the context clearly dictates otherwise. Thus, for example, reference to a fiber can include multiple fibers unless the context clearly dictates otherwise.

As used herein, the term "fiber diameter" is used to describe the average or mean diameter of a particular fiber.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations, which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Additionally, features from particular embodiments may be combined with features from other embodiments as would be understood by one of ordinary skill in the art. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

What is claimed is:

1. A method for making a nonwoven web comprising a layer of polymeric fibers, the method comprising:
compounding at least two immiscible or partially miscible polymers comprising a liquid crystalline polymer (LCP) and polybutylene terephthalate (PBT) to obtain a LCP/PBT alloy;
blending PBT with the LCP/PBT alloy to obtain a polymer mixture; and
melt-blowing the polymer mixture such that based on a total number of polymeric fibers:
at least 25% of the polymeric fibers in the layer are coarse fibers having a fiber diameter of 4 μm or more and at least 25% of the polymeric fibers in the layer are fine fibers having a fiber diameter of 2 μm or less,
the polymeric fibers in the layer have a bimodal distribution of their fiber diameters, comprising a first peak at a first fiber diameter of 2 μm or less, a second peak at a second fiber diameter of 4 μm or more, and a trough at a third fiber diameter between the first fiber diameter and the second fiber diameter, and
10% or less of the polymeric fibers have a fiber diameter within ±0.5 μm of the third fiber diameter, based on the total number of polymeric fibers.

2. The method of claim 1, wherein the blending is performed by physically blending the at least two immiscible or partially miscible polymers.

3. The method of claim 1, wherein the polymer mixture comprises 0.5-30 wt. % LCP.

4. The method of claim 1, wherein the LCP/PBT alloy comprises 0-40 wt. % LCP and subsequent to blending of the LCP/PBT alloy with the PBT, the polymer mixture comprises 1-30 wt. % PBT and 0.5-10 wt. % LCP.

5. The method of claim 1, wherein the melt-blowing is performed by extruding the polymer mixture through a die at: (a) a die temperature in a range of 250-310° C.; (b) an air flow rate in a range of 4-14 m³/min; (c) a throughput of the 4-20 kg/hr; (d) a drum collector distance in a range of 10-50 cm; and (e) an extruder speed in a range of 50-120 rpm.

6. The method of claim 1, wherein between 30%-40% of the polymeric fibers in the layer are coarse fibers having a fiber diameter between 4 μm and less than 10 μm, and 40%-60% of the polymeric fibers in the layer are fine fibers having a fiber diameter of 2 μm or less.

7. The method of claim 1, wherein at least 25% polymeric fibers in the layer are coarse fibers having a fiber diameter of 5 μm or more, based on the total number of polymeric fibers.

8. The method of claim 1, wherein at least 25% polymeric fibers in the layer are fine fibers having a fiber diameter of 1 μm or less, based on the total number of polymeric fibers.

9. The method of claim 1, wherein the nonwoven web is configured to filter a fluid including each of air, fuel, and a lubricant.

10. The method of claim 1, wherein the polymer mixture comprises 1-30 wt. % PBT.

11. The method of claim 1, wherein the fiber diameters of the polymer fibers have a fiber size distribution ranging from 0.2 μm to 30 μm.

12. A nonwoven web comprising a layer of polymeric fibers formed by the process of:
compounding at least two immiscible or partially miscible polymers comprising a liquid crystalline polymer (LCP) and polybutylene terephthalate (PBT) to obtain a LCP/PBT alloy;
blending PBT with the LCP/PBT alloy to obtain a polymer mixture; and
melt-blowing the polymer mixture such that based on a total number of polymeric fibers:
at least 25% of the polymeric fibers in the layer are coarse fibers having a fiber diameter of 4 μm or more and at least 25% of the polymeric fibers in the layer are fine fibers having a fiber diameter of 2 μm or less,
the polymeric fibers in the layer have a bimodal distribution of their fiber diameters, comprising a first peak at a first fiber diameter of 2 μm or less, a second peak at a second fiber diameter of 4 μm or more, and a trough at a third fiber diameter between the first fiber diameter and the second fiber diameter, and
10% or less of the polymeric fibers have a fiber diameter within ±0.5 μm of the third fiber diameter, based on the total number of polymeric fibers.

13. The nonwoven web of claim 12, wherein the blending is performed by physically blending the at least two immiscible or partially miscible polymers.

14. The nonwoven web of claim 12, wherein the polymer mixture comprises 0.5-30 wt. % LCP.

15. The nonwoven web of claim 12, wherein the LCP/PBT alloy comprises 0-40 wt. % LCP and subsequent to blending of the LCP/PBT alloy with the PBT, the polymer mixture comprises 1-30 wt. % PBT and 0.5-10 wt. % LCP.

16. The nonwoven web of claim 12, wherein between 30%-40% of the polymeric fibers in the layer are coarse fibers having a fiber diameter between 4 μm and less than 10 μm, and 40%-60% of the polymeric fibers in the layer are fine fibers having a fiber diameter of 2 μm or less.

17. The nonwoven web of claim 16, wherein the bimodal distribution of their fiber diameters, comprises a first peak at a first fiber diameter of 2 μm or less, a second peak at a second fiber diameter between 4 μm and less than 10 μm, and a trough at a third fiber diameter between the first fiber diameter and the second fiber diameter.

18. The nonwoven web of claim 12, wherein the nonwoven web is configured to filter a fluid including each of air, fuel, and a lubricant.

19. The nonwoven web of claim 12, wherein the polymer mixture comprises 1-30 wt. % PBT.

20. The nonwoven web of claim 12, wherein the fiber diameters of the polymer fibers have a fiber size distribution ranging from 0.2 μm to 30 μm.

* * * * *